United States Patent [19]
Heintze

[11] 3,943,429
[45] Mar. 9, 1976

[54] METHOD AND APPARATUS FOR OPERATING AN INVERTER CONSISTING OF TWO SUB-INVERTERS

[75] Inventor: Konrad Heintze, Erlangen, Germany

[73] Assignee: Siemens Aktiengesellschaft, Munich, Germany

[22] Filed: June 27, 1974

[21] Appl. No.: 483,538

[30] Foreign Application Priority Data
July 13, 1973 Germany.......................... 2335713

[52] U.S. Cl............... 321/26; 321/9 A; 321/27 MS
[51] Int. Cl.²......................................... H02M 7/00
[58] Field of Search.... 321/9 A, 26, 27 MS, DIG. 1; 318/227

[56] References Cited
UNITED STATES PATENTS

| | | | |
|---|---|---|---|
| 3,573,602 | 4/1971 | Jensen | 321/9 A |
| 3,611,086 | 10/1971 | Mokrytzki et al. | 321/9 A |
| 3,662,247 | 5/1972 | Schieman | 321/9 A |
| 3,694,718 | 9/1972 | Graf et al. | 321/9 A |
| 3,739,253 | 6/1973 | Humphrey et al. | 321/9 A |
| 3,781,635 | 12/1973 | Sauer | 321/26 |

Primary Examiner—William M. Shoop
Attorney, Agent, or Firm—Kenyon & Kenyon Reilly Carr & Chapin

[57] ABSTRACT

An improved method and apparatus for operating an inverter comprising two sub-inverters having their outputs connected with each other through a choke with a center tap in which the outputs are controlled such that two AC output voltages displaced in phase with respect to each other are applied to the choke. According to the present invention in order to minimize the voltage-time area at the choke, the two AC voltages are reversed in polarity within the range of the control angle at least once with reversals in the two voltages always taking place at the same time and in opposite directions.

17 Claims, 34 Drawing Figures

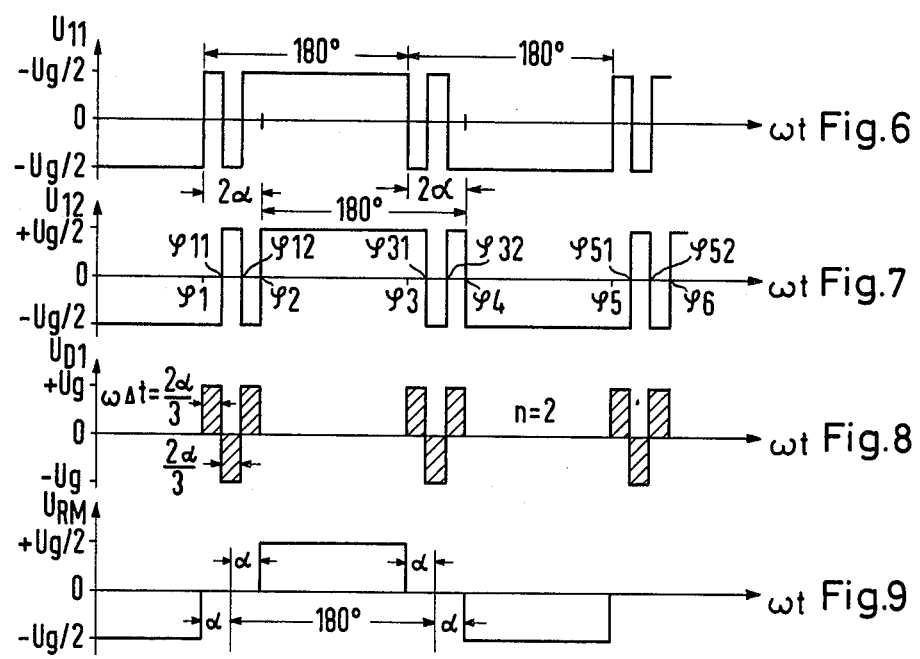
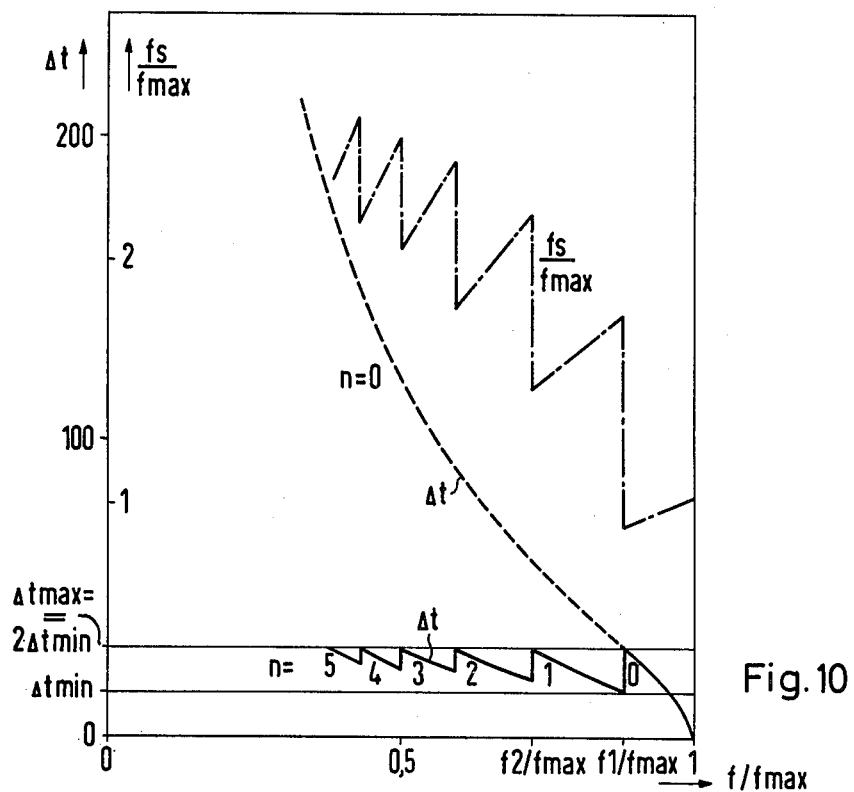

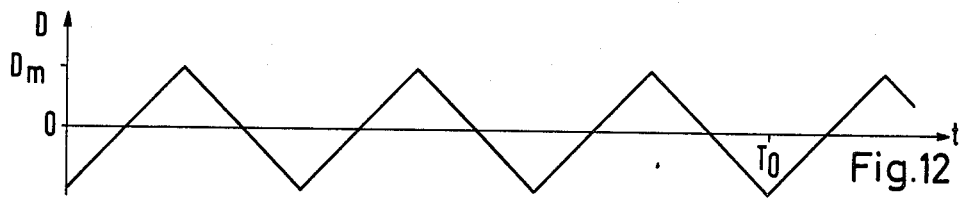
Fig.12
Fig.13
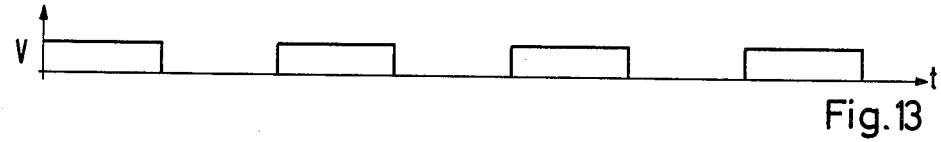
Fig.14
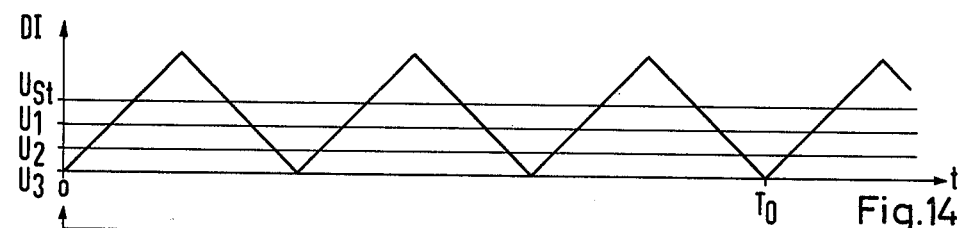
Fig.15
Fig.16
Fig.17
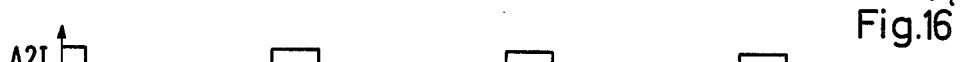
Fig.18
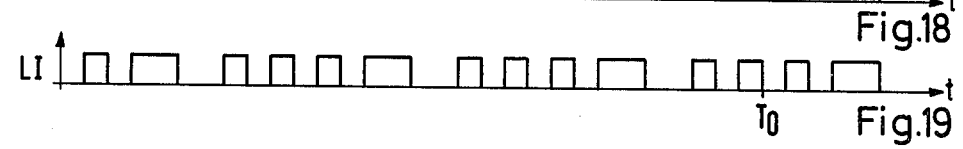
Fig.19

METHOD AND APPARATUS FOR OPERATING AN INVERTER CONSISTING OF TWO SUB-INVERTERS

BACKGROUND OF THE INVENTION

This invention relates to inverters of the type comprising two sub-inverters in general and more particularly to an improved method and apparatus for controlling such an inverter so as to minimize the size of choke needed.

It has been recognized that by connecting in parallel two identical inverters, hereinafter referred to as sub-inverters, an inverter having an advantageous control characteristic can be constructed. Typically, the sub-inverters will be provided with thyristors or switching transistors used as controlled rectifiers. The advantage of a self-commutating inverter of a design of this nature is that on one hand the output power is increased and on the other hand, the output voltage can be controlled in fine steps by assigning an individual switching pattern to each sub-inverter.

The typical converter of this type comprises two three-phase sub-inverters having inputs connected to a DC voltage source. Typical of this type inverter is that described in the conference report "Conference Report, IEEE International Semiconductor Power Converter Conference," Baltimore, Md., USA, May 8 to 10, 1972, page 2-4-1 to 2-4-6., particularly FIG. 3. The respective output terminals of the sub-inverters are connected through a choke which has a center tap. The three-phase voltage output of the inverter is then taken off at the three center taps. The two AC output voltages provided as inputs to the choke are displaced with respect to each other by an adjustable control angle. The chokes insure that the AC output voltages are averaged. In this prior art inverter, the resulting voltage and thus, the voltage at the load is controlled by changing the control angle. A control unit is used to displace the control pulses which are provided to the sub-inverters with respect to each other such that the desired control angle and as a result, the desired voltage at the load is obtained. This method is referred to as the slewing method, addition method or the rotary transformer principle.

From the dissertation of H. Stemmler "Control Methods for Single- and Multi-pulse Subharmonic Inverters for the supply of Squirrel-Cage Rotor Motors," Rheinish-Westphalian Technical University Aachen, 1970, FIG. 5/III.4 on page 363 and the accompanying description on page 81, the three-phase inverter described above is known but without the above mentioned slewing method. As described, a total of six single phase sub-inverters supplied from a common DC voltage source are provided. These are combined in pairs to form single-phase inverters with the two sub-inverters of a pair connected together through a suction coil with a center tap. The center taps of the three coils or chokes are connected to a Y-connected three phase rotating field machine. The magnetic design of each of the three chokes must be such that it can withstand the difference voltage time area of the AC output voltages of the two sub-inverters. Thus, each choke maintains a share of the DC voltage being supplied for certain time intervals. This requires that the choke be of considerable size in turn resulting in a large weight of the three inverters. This is a severe disadvantage, particularly where the volume and/or weight of the inverter must be kept as small as possible. An example of such an application is where the inverter is to be used for the propulsion of a self-propelled electric vehicle. In such a case, the smallest possible chokes must be used to save weight and at the same time, reduce cost.

Thus, it can be seen that there is a need for an inverter that offers the advantages of the slewing method as noted above but at the same time can be constructed using a smaller choke than would otherwise be necessary.

SUMMARY OF THE INVENTION

The present invention provides a method of operating an inverter of this nature and a circuit arrangement for carrying out this operation which enables the minimum possible size or choke to be used, therefor resulting in a lightweight and inexpensive inverter.

This is accomplished according to the present invention by reversing the two AC output voltages applied to the two sides of the choke within the range of the control angle (during which time they have opposite polarity) at least once and carrying out this reversal so that the two voltages are always reversed at the same time and in opposite directions. By operating in this fashion when within the range of the control angle where positive and negative voltage time areas are generated, the voltage time areas are limited to a maximum width which is only a fraction of the control angle. This substantially reduces the magnetic stress which is applied to the choke permitting a choke design adapted for a smaller voltage time area. As a result, the size and thus the cost of the choke is substantially reduced.

A particular advantage of the method of the present invention is that the resulting voltage formed by the two AC voltages is not influenced by the reversals occurring within the range of the control angle. The output voltage is always zero during this period. As a result, the voltage at the output of the inverter can be, for full drive, the maximum theoretical value predetermined by the magnitude of the input voltage. Since the repeated reversal of the two AC voltages occurs only in the range of the control angle, the present system can be referred to as a partially pulsed inverter. Its switching frequency can be kept relatively low as compared to fully pulsed operation. As a result, the required equipment for controlling the inverter is much less than that required to control an inverter with the same range of control and which operates according to the prior art method of pulse width modulation using pulsed output voltages. As an example of such operation, see Siemens Zeitschrift Vol. 45 (1971), no. 3, pages 154 to 161.

In accordance with a further feature of the present invention, the range of the control angle is sub-divided by the reversals of the two sub-inverters into a number of equal sections. This leads to a particularly simple design of the control unit since the reversing commands can then be given at equal time intervals. As the control angle changes, the time spacing between two reversals will also change with the number of sections being kept constant. In accordance with a further feature of the invention, proper operation of the inverter is insured by a type of operation such that, with a reduction of the control angle, the time spacing between two reversals is not allowed to fall below a lower limit which is determined essentially by the recovery time of the controlled rectifiers of the sub-inverters.

Such can be accomplished by switching the inverter off when the lower limit is reached. However, an interruption of operation of this nature can be avoided instead by reducing the number of sections when the control angle is reduced and the lower limit reached. This results in an increase of the width of the remaining sections so that there is no possibility of operation below the lower limit. On the other hand, if the control angle increases, the procedure is reversed and the number of sections increased in steps. Summarizing this further feature of the invention, it can be said that the number of sections into which the control angle region is divided changes as the control angle changes to always insure that the voltage time area at the choke is maintained at a minimum value which does not go below a predetermined lower limit.

In changing over the number of sections, it is preferable that the number be always increased or decreased by steps of one. As noted above, with increasing control angles, the number of sections between two respective reversals or switching operations can be increased in steps. It is preferable in this connection if a predetermined upper time limit which must not be exceeded in view of the choke design is established. Starting with these consideratiions in mind, a further feature of the method of the present invention provides that with decreasing operating frequency of the two sub-inverters and/or increasing control angle, an increase in the number of sections takes place whenever the time spacing between the two reversals has become equal to a predetermined upper limit. Preferably, the upper limit is chosen to be equal to twice the lower limit which as noted above is determined essentially by the recovery time of the controlled rectifiers of the sub-inverters.

A circuit for carrying out the method of the present invention is disclosed. In this circuit, a frequency generator provides two modified triangular voltages having equal frequency and amplitude but phase shifted relative to each other by one half their period. Two comparator means, each having a plurality of comparators have the modified triangular voltages and a number of fixed voltages comprising equal portions of a common control voltage obtained by means of a voltage divider as inputs. The outputs of the comparators are provided to two modulation means which from these inputs determine the timing of the desired AC voltages of the sub-inverters in the range of the control angle in such a manner that a reversal takes place each time one of the comparators is switched.

Details of the various circuits such as comparator circuits, voltage divider circuits and modulation means are disclosed in detail.

BRIEF DESCRIPTION OF DRAWINGS

FIGS. 6 to 9 are voltage time diagrams illustrating operation according to the method of the present invention.

FIG. 10 is a graph illustrating range changes as operating frequency and control angle are changed according to the present invention.

FIG.. 11 is a block diagram of a circuit arrangement for implementing the method according to the present invention.

Figure 11:
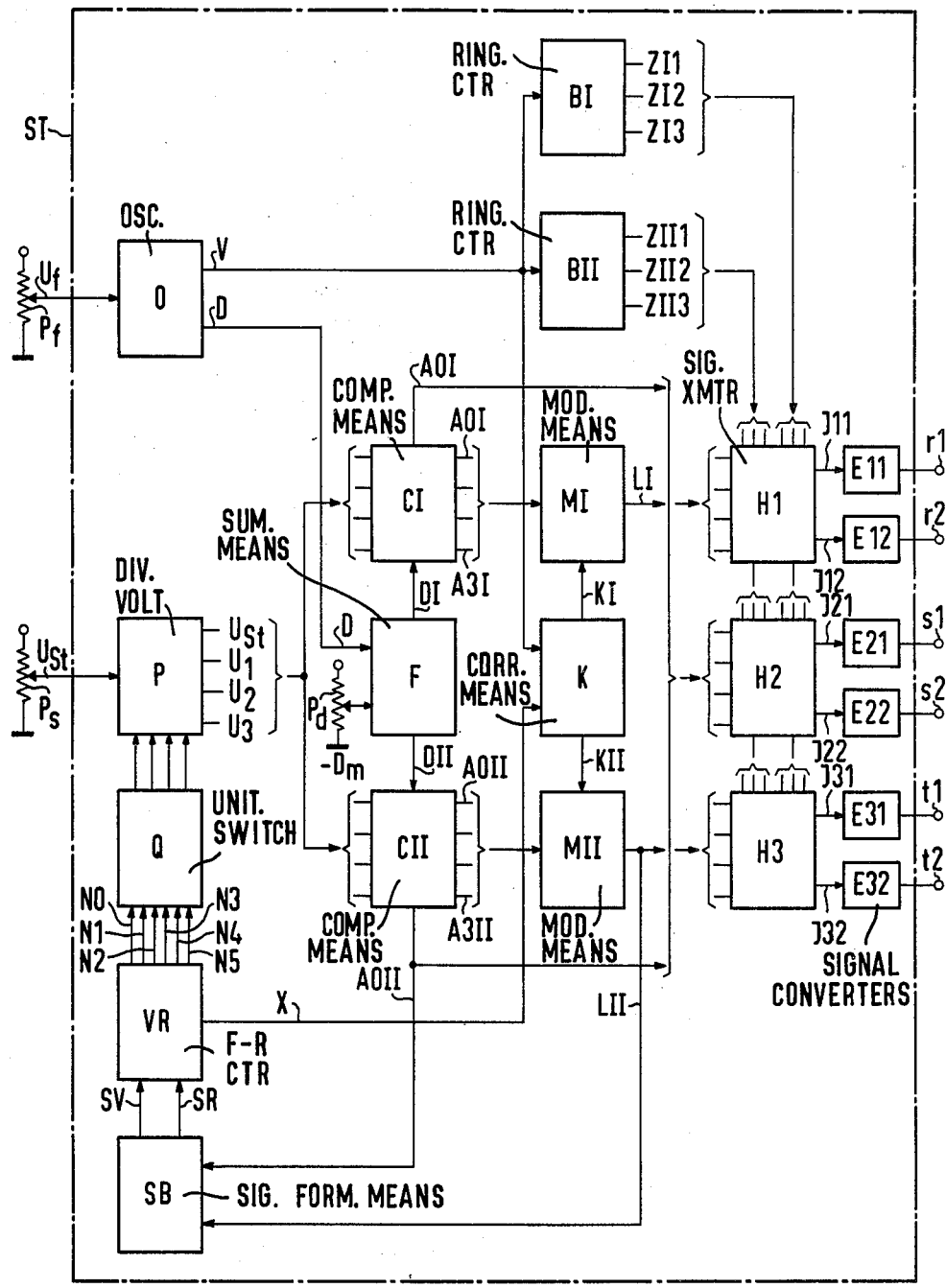

FIGS. 12 to 30 are wave-form diagrams illustrating operation of the circuit arrangement of FIG. 11.

Figure 31:
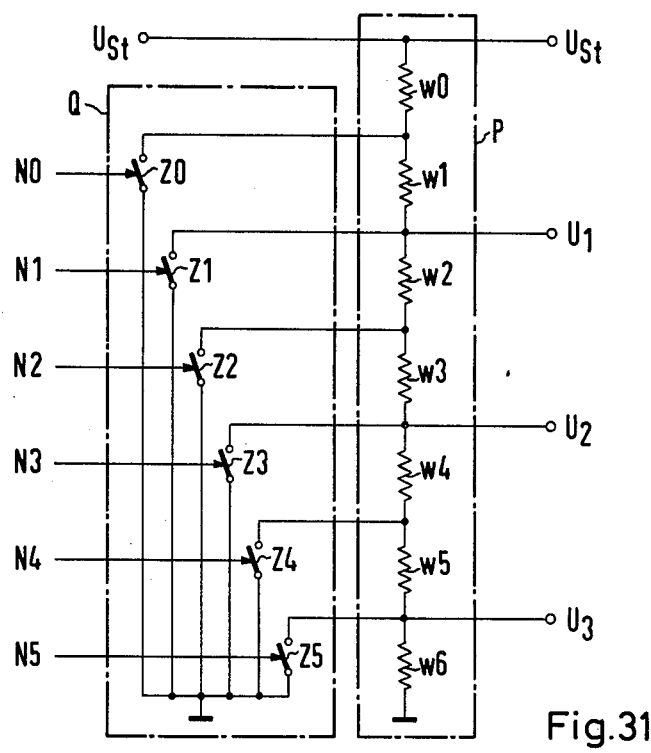

FIG. 31 is a schematic diagram of the voltage divider and switching arrangement of FIG. 11.

Figure 32:
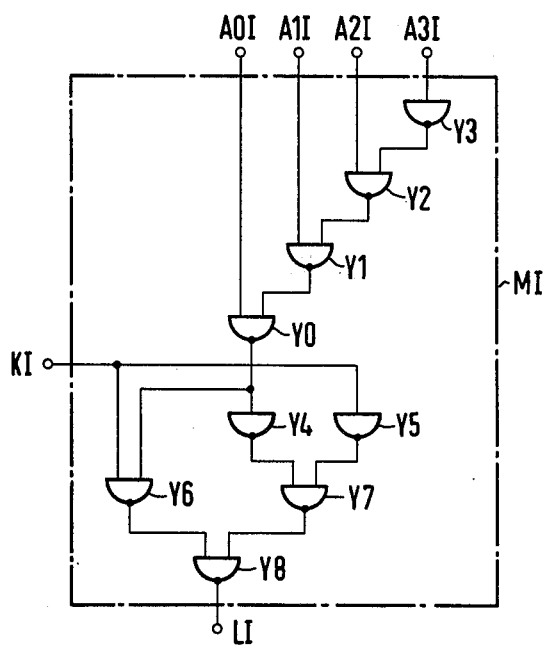

FIG. 32 is a logic diagram of the modulation means of FIG. 11.

Figure 33:
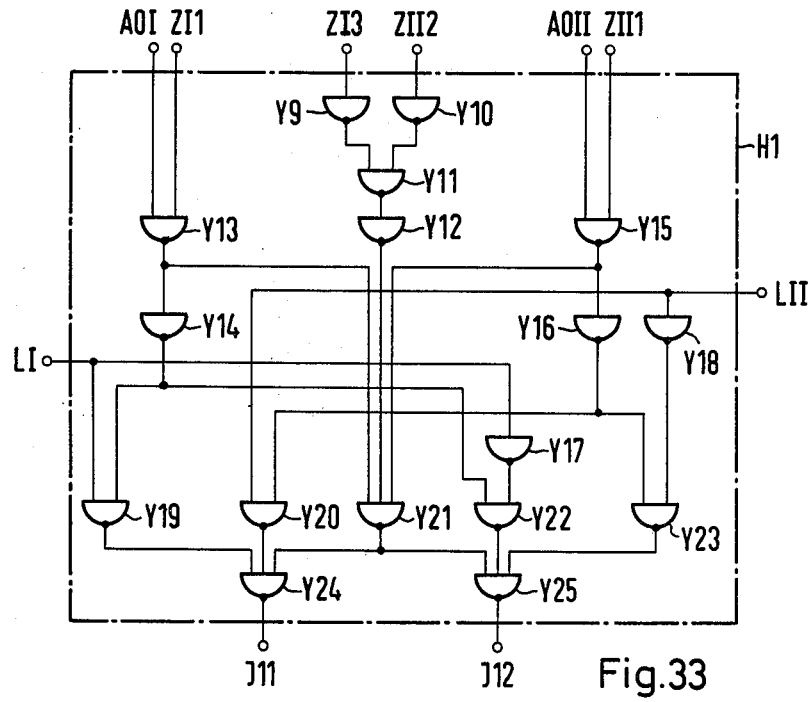

FIG. 33 is a logic diagram of the phase signal transmitter of FIG. 11.

Figure 34:
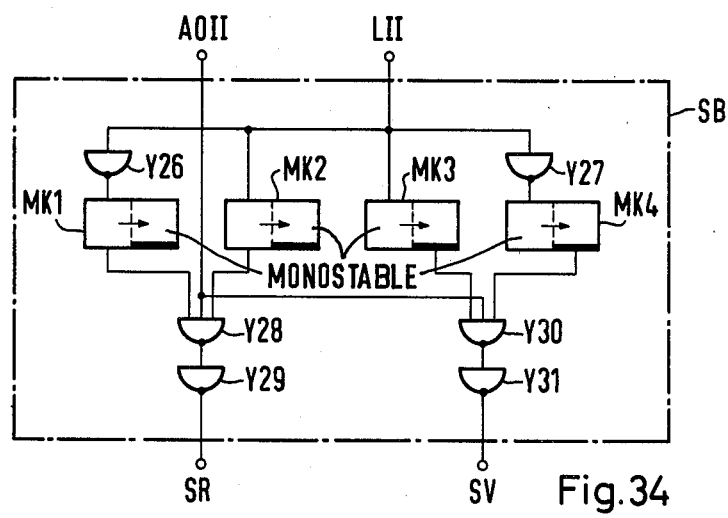

FIG. 34 is a schematic diagram of the setting-signal means of FIG. 11.

DETAILED DESCRIPTION OF THE PREFERRED EMBODIMENT

Figure 1:
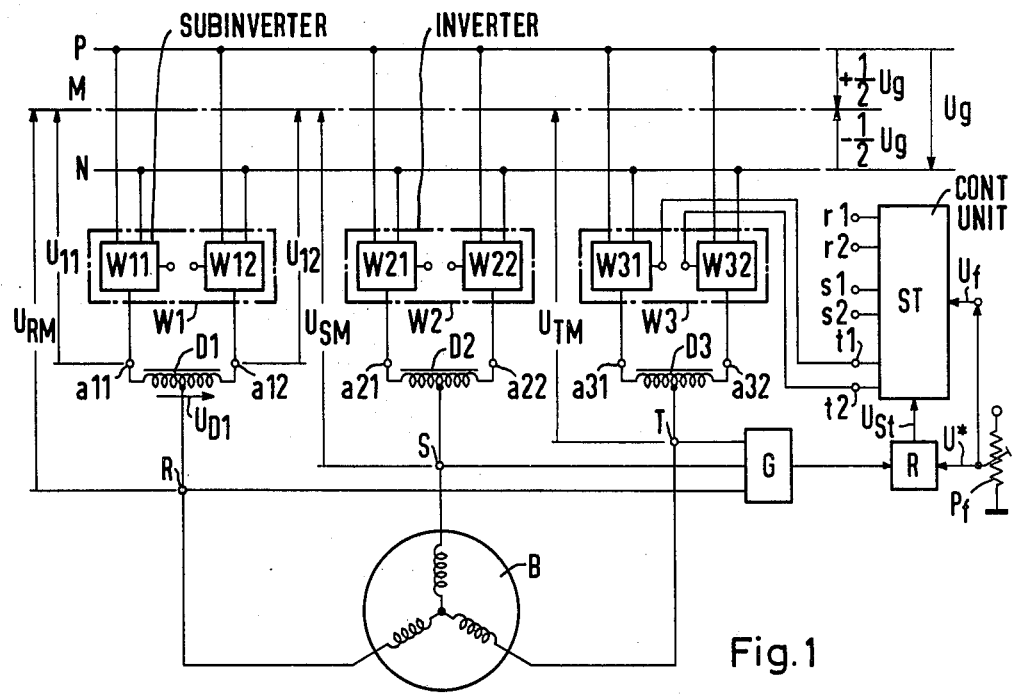
FIG. 1 is a block diagram of a three-phase inverter circuit having three inverters, each consisting of two sub-inverters along with control circuits for carrying out the method of the present invention.

FIG. 1 illustrates a three-phase inverter circuit having three inverters W1, W2 and W3 providing power to a three-phase load designated B. Each of the three inverters W1, W2 and W3 comprises two similarly constructed sub-inverters W11, W12; W21; and W31, W32. The inputs to each of the sub-inverters is connected to a common DC voltage source. As illustrated, this may comprise positive and negative DC buses designated P and N respectively between which an uncontrolled voltage $U_g$ appears. The voltage may be obtained from the third rail of a self-propelled vehicle or may be from the output terminals of an uncontrolled rectifier or battery. A virtual neutral designated M and helpful in an understanding of the present invention is shown on the figure. Thus, between the virtual neutral and the positive bus P, a voltage $+U_g/2$ will appear and between the virtual neutral and negative bus, a voltage $-U_g/2$.

The outputs of the sub-inverters W11, W12 are connected to the two ends A11 and A12 respectively of a center tapped choke D1. Similarly, the two sub-inverters W21 and W22 are coupled to the terminal points A21 and A22 of a second choke D2. The outputs of the sub-inverters W31 and W32 are connected to the terminals A31 and A32 of the center tapped choke D3. As illustrated, the two component windings of each of the chokes are magnetically coupled with a common magnetic core being indicated by the line above the chokes. The chokes D1, D2 and D3 act as suction chokes and may also be considered as auto-transformers. They combine the AC output voltages furnished by the sub-inverters W11, W12; W21, W22; and W31, W32 to form resulting voltages which can be taken off at the taps R, S and T.

The load B which may be a rotating field machine of fairly large rating such as that found in electric railroad vehicle or steel mill is shown as being Y-connected and coupled to the taps R, S and T. A control unit ST is provided for controlling the sub-inverters W11, W12 . . . W32. Control unit ST supplies the sub-inverters with control signals over control lines. In order to keep the figure simple, only a total of two control lines are shown leading from the control unit ST to the sub-inverters W31 and W32. The control unit ST controls the remaining two inverters W1 and W2 in similar fashion and in such a manner that the resulting voltages $U_{RM}$, $U_{SM}$, and $U_{TM}$ taken off at the taps R, S and T when measured against the neutral M are separated from each other by 120° in phase.

The control unit ST is provided with an input frequency control voltage $U_{St}$ which is generated in a voltage control circuit R. Voltage control circuit R has provided to it the actual value of the AC output voltages through an actual valve transmitter G such as a voltage transformer coupled to the taps R, S and T and a reference value input U* obtained from a reference value transmitter $P_f$ such as a potentiometer. In well known fashion, the actual voltage from transmitter G is compared with a desired voltage U* to provide an output to control the apparatus to bring the two into correspondence. Since the voltage and frequency are controlled in proportion to each other, a voltage $U_f$ may be taken from the potentiometer $P_f$ to provide a frequency control voltage $U_f$ to the control unit ST.

In the illustrated embodiment, the sub-inverters W11 and W32 are designated so that they have an off-on characteristic. Their electrical output voltage measured at the output terminals all through a32 must be able to alternate between the positive potential of the positive DC bus bar and the negative potential of the negative DC bus bar N.

Sub-inverters which meet this requirement are well known in the art. They employ either transistors or thyristors as controlled rectifiers. Typically, a total of six self-commutating pulsed inverters such as those described in Siemens Zeitschrift vol. 45 (1971), no. 3, pages 154 to 161, FIG. 8 and which are equipped with two commutation chokes between the main rectifiers can be used as the sub-inverters W11 to W32. Also useful for the sub-inverters of FIG. 1 are those shown and described in BBC Nachrichten, vol. 48 (1966) no. 1/66, pages 46 to 52, FIG. 1. In addition to sub-inverters W11 to W22 may comprise the type shown in the textbook "Principles of Inverter Circuits" by B. D. Bedford and R. G. Hoft, John Wilely & Sons, New York, London, Sidney, 1964, page 167, FIG. 7.1.

The AC output voltages of the sub-inverters W11 to W32 are squarewave voltages, whose fundamental frequency is the operating frequency at which the load B is operated. There is always a phase shift between the AC output voltages of associated sub-inverters W11 to W32 which can be used for control or regulating purposes to regulate the resulting voltages provided thereby. Such control is known by the term slewing method, addition method or method according to the rotary transformer principle. This known method will now be described using the embodiment of FIG. 1 and the waveforms of FIGS. 2 through 5. The explanation deals with the inverter W1 but is equally applicable to the inverters W2 and W3. The only difference is that the output voltages of these inverters are shifted 120° with respect to each other.

Figure 2:
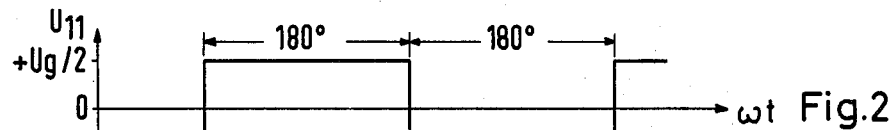
FIGS. 2 through 5 are voltage-time diagrams illustrating the known method of slewing operation.
Figure 3:
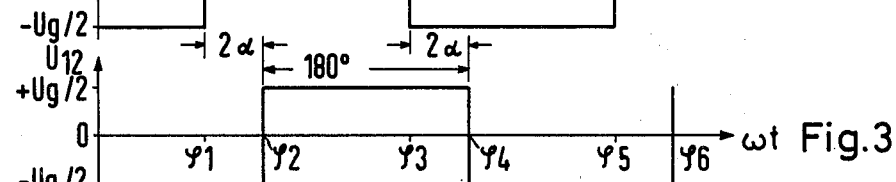
Figure 4:
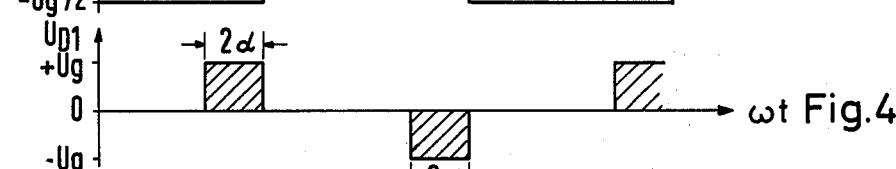
Figure 5:
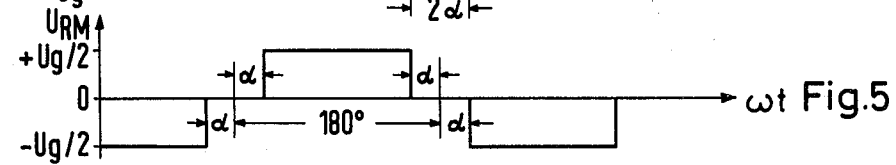

FIGS. 2 and 3 show the wave shape of the AC output voltages $U_{11}$ and $U_{12}$. FIG. 4 shows the waveshape of the choke voltage $U_{D1}$ and FIG. 5 the waveshape of the resulting voltage $U_{RM}$ all as a function of time t with the angular frequency $\omega = 2\pi f$ fixed, where $f$ is the operating frequency of the inverter W1. As shown, there is a phase shift by the angle $2\alpha$ between the AC output voltages $U_{11}$ and $U_{12}$. This is adjustable and is hereinafter referred to as the control angle $2\alpha$. As a result of this control, a control signal for the main rectifiers of the first sub-inverters W11 are phase shifted relative to the corresponding control signals of the second inverter by this control sngle $2\alpha$. During the time interval $2\alpha/\omega$ corresponding to the control angle $2\alpha$ the AC output voltages $U_{11}$ and $U_{12}$ have different polarities. As a result, the resulting voltage $U_{RM}$ obtained by addition is zero as shown on FIG. 5. The resultant voltage $U_{RM}$ thus appears "gated," i.e., the r.m.s. value of its fundamental decreases with an increase of the half control angle $\alpha$ according to the cosine function.

In the time intervals $2\alpha/\omega$ corresponding to the control angle $2\alpha$, the choke D1 must withstand the full DC voltage. The choke voltage $U_{D1}$ over the full winding is illustrated in FIG. 4 and marked by shading. It is alternatingly $+U_g$ and $-U_g$. The voltage-time area which stresses the choke D1 magnetically thus has an amplitude $U_g$ and a width corresponding to the control angle $2\alpha$.

It is clear from an examination of FIGS. 2 through 5 that as the control angle $2\alpha$ increases, the voltage time area stressing choke increases. Thus, if operation over a wide range is to be provided in a conventional system such as that just described, the choke must be designed to withstand large stresses.

FIGS. 6 to 9 illustrate the type of operation according to the method of the present invention which is used to reduce the maximum stress placed on the choke and thereby permit smaller and less costly chokes to be used. Essentially, what is done is to operate the system in a pulsed manner within the range of the control angle $2\alpha$ so that the voltage time areas at the choke D1 are considerably reduced. Note that pulsed operation takes place only within the range of the control angle $2\alpha$. As illustrated, there are two such ranges within the period of the two AC output voltages $U_{11}$ and $U_{12}$. Within these two ranges, the two AC output voltages are reversed at least once and are always reversed at the same time. The example shown on FIGS. 6 to 9 is one in which during the range of the control angle $2\alpha$ both AC output voltages $U_{11}$ and $U_{12}$ are simultaneously reversed two times, i.e., $n = 2$. The number n refers to the number of reversals or switch overs occuring during the range of the control angle $2\alpha$. The beginning and the end of the range is not counted in designating the number of switche overs. As will be seen below, the number $n$ can be considerably larger than two.

FIGS. 6 and 7 illustrate the waveshape of the partially pulsed AC output voltages $U_{11}$ and $U_{12}$. FIG. 8 shows the waveshape of the choke voltage $U_{D1}$ and FIG. 9 shows the waveshape of the corresponding resultant voltage $U_{RM}$. From the figures, it is evident that two additional reversals take place between the angles $\phi_1$, and $\phi_2$ at the angles $\phi_{11}$ and $\phi_{12}$. The changes occur simultaneously and in opposite direction as shown by FIGS. 6 and 7. In similar fashion, two addtional reversals occur at the angle between the angles $\phi_3$ and $\phi_4$ at the angles $\phi_{31}$ and $\phi_{32}$. Also shown are two additional reversals between the angles $\phi_5$ and $\phi_6$ occuring at the angles $\phi_{51}$ and $\phi_{52}$. The switching frequency $f$ of each AC output voltage $U_{11}$ and $U_{12}$ is thus increased to $(n+1) = 3$ times the operating frequency $f$. As illustrated by FIGS. 6 and 7, the reversals are preferably made such that the range of the control angle $2\alpha$ is subdivided into a number $(n+1)$ of sections which are all of the same size.

Since, just as noted, the additional switching of the voltages within the control angle range subdivide the control angle $2\alpha$ into sections of equal length, the voltage time area across the choke is not a voltage block of width $2\alpha$ as shown on FIG. 4 but instead a total of $(n+1) = 3$ voltage blocks of alternating polarity each having a width $\omega \Delta t = 2\alpha/(n+1) = 2\alpha/3$ as shown on FIG. 8. The choke thus need only be designated to handle one of those voltage blocks and its stress is thereby reduced by a factor of $1/(n+1) = \frac{1}{3}$.

It should be remembered that in general cases, n additional reversals cause an increase of the switching frequency to ($n+1$) times the operating frequency f and a reduction of the stress of the choke D1 proportional to a factor $1(n+1)$. It should further be noted that the resulting voltage $U_{RM}$ shown on FIG. 9 remains unchanged at zero, in the range of the control angle $2\alpha$. Thus, it is the same as that shown on FIG. 5. This results because the two sub-inverters W11 and W12 furnish constant AC output voltages $U_{11}$ and $U_{12}$ which are always of different polarity. As a result, the voltage $U_{RM}$ and therefor the overall output voltage of the inverters W1, W2 and W3 is not influenced by the pulsing within the control angle range.

In order to bring about a substantial reduction of the physical size of the chokes, the number of additional reversals should be selected as high as possible. However, the switching frequency of the sub-inverters W11 and W12 increases with the number n. This results in decreased spacing of the DC switching edges and thus decreased width of the sections within the control angle range. This width cannot fall below a certain minimum time $\Delta t_{min}$ in view of the commutation processes occuring in the sub-inverters W11 and W12. Thus, an optimum number n is obtained for each output frequency f and for each control angle $2\alpha$ taking into consideration the permissible operating data.

Where a large control range with regard to operating frequency in output voltage is to be provided, the number n must be varied from range to range. The curve in solid lines on FIG. 10 illustrates the time spacing $\Delta t$ between two additional reversals, i.e., the width $\Delta t$ of the individual voltage blocks such as those on FIGS. 4 and 8 at the choke D1 as a function of the operating frequency f referred to the maximum operating frequency $f_{max}(f/f_{max})$. On this figure, it is assumed that the resultant voltage $U_{RM}$ is changed by means of the control angle $2\alpha$ proportional to the operating frequency $f$. Such a proportionality is normally required where a rotating-field machine, such as an asynchronous machine, is the load B. The time spacing $\Delta t$ is thus a measure of the time voltage area and the stress on the choke.

In the region of maximum operating frequency $f_{max}$ ($f/f_{max} = 1$) the number $n = 0$. This corresponds to the known operating method illustrated by FIGS. 2 to 5. With decreasing operating frequency $f$, the control angle $2\alpha$ increases and thus the time spacing $\Delta t$ of the control angle increases therewith. When the spacing $\Delta t$ reaches a predetermined maximum vlaue $\Delta t_{max}$ at an operating frequency $f_1$, the number n is increased from zero to one and the time spacing $\Delta t$ is therefor cut to half the value of $\Delta t_{min}$.

The maximum value $\Delta t_{max}$ is preferably equal to twice the minimal time $\Delta t_{min}$ of the inverter which is determined, for example, by the recovery time of the devices used therein. As the operating frequency f decreases further, the maximum value $\Delta t_{max}$ is again reached at the operating frequency $f2$. At this point, the number $n$ is again increased to $n = 2$ and the control angle $2\Delta$ is now divided into $n = 3$ sections. Operation continues in the manner illustrated by the sawtooth waveshape shown at the bottom of FIG. 10. It will be recognized that this waveshape can be traversed in either the forward or reverse direction, i.e., the number n can be increased or decreased. It should be noted that the increase or decrease of the number n need not be in steps of one. With higher numbers n, steps of 2 or more may be indicated. In any case, the design of the choke depends on the relatively low maximum value $\Delta t_{max}$.

For purposes of comparison, there is also plotted on FIG. 10, a curve $\Delta t$ which illustrates operation of the type disclosed in connection with FIGS. 2 through 5. That is, where n remains at zero. It is evident that with decreasing frequency an increase of the time spacing $\Delta t$ occurs. Thus, the greater the frequency range control to be provided, the larger must be the physical size of the choke. The final curve plotted on FIG. 10 on the top right-hand side plots switching frequency $f_s$ of one of the sub-inverters W11, W12 against the maximum operating frequency $f_{max}$ as a function of the relative operating frequency $f/f_{max}$. From this curve, it is evident that with the method according to the present invention, the necessary relative switching frequency change is within the range of about 1 to 2.5 where the voltage is controlled between 100 and 50 percent of the maximum value.

FIG. 11 illustrates an embodiment of the control unit ST shown on FIG. 1 for carrying out the method of the present invention. Although it was indicated on FIG. 1 that one potentiometer $P_s$ could be used for providing both a frequency and voltage reference value, FIG. 11 illustrates the more general case where separate potentiometers $P_s$ and $P_f$ are employed. The potentiometer or reference value transmitter $P_s$ provides a control voltage $U_{St}$ and the reference value transmitter or potentiometer, a frequency control voltage $U_f$.

The frequency control voltage $U_f$ is an input to a voltage control oscillator 0 which provides as an output a triangular voltage D, the waveshape of which is shown with respect to time on FIG. 12. It also provides as an output a square wave voltage V synchronized with the triangular voltage V. This square wave voltage V is shown on FIG. 13. In well known fashion, the frequency of the two voltages D and V at the output of the oscillator 0 will be controlled by the input voltage $U_f$. As will become evident, the frequency of these two voltages is three times the desired fundamental frequency of the resultant voltage such as the voltage $U_{RS}$ shown on FIG. 1. The period for the fundamental frequency is shown on FIG. 12 by $T_0$.

The triangular voltage D is provided to summing means F. Summing means F has as an additional input, a voltage $-D_m$ set in using a potentiometer $P_d$. The amplitude of this voltage is equal to the amplitude of the triangular voltage D. In appropriate summing amplifiers the fixed voltage $-D_m$ is combined with the waveform D to provide two triangular voltage outputs DI and DII shown on FIGS. 14 and 20 respectively. As is evident, these waveforms are obtained by summing the voltage D with the voltage $D_m$, in one case the voltage waveform D is inverted. The result is two triangular waveforms which vary between zero and $2 D_m$ and which have their phase shifted by $T_0/6$. The voltages DI and DII are fed to respective comparator means CI and CII. Each of the comparator means CI, CII contains a plurality of analog voltage comparators of conventional design.

On FIG. 11, the control voltage $U_{St}$ is shown as being fed to a voltage divider P. The voltage divider P divides the control voltage $U_{St}$ into a number of partial voltages having equidistant steps. Thus, at the output of the voltage divider, there is provided in addition to the control voltage $U_{St}$, a number of voltages $U_1, U_2 \ldots$ each of which is a fraction of the voltage $U_{St}$.

The voltage divider P is shown in detail on FIG. 31. The illustrated embodiment is set up for use where the maximum number $n$ of reversals is 6. The number n of reversals is the number of reversals in the range of the control angle 2 $\alpha$ referred to above. As illustrated, the voltage divider comprises seven resistors W0 - W6 of equal value in series between the voltage $U_{St}$ and ground. From the resistor W0, the voltage $U_{st}$ is taken off. At each junction point, a line is taken to one side of a switch. A plurality of five switches are thus provided labelled Z0, Z1 . . . Z5. The other side of each of the switches is connected in common to ground. A voltage $U_1$ is provided from the junction of the resistors W1 and W2, a voltage $U_2$ from the junction of the resistors W3 and W4 and a voltage $U_3$ from the junction of the resistors W5 and W6. It should be noted that in general, $n+1$ resistors are required where a maximum of $n$ additional reversals are to be provided within the control angle range. Although the switches Z0 through Z5 are shown as mechanical switches, it is preferable that they be electronic switches such as field effect transistors. These switches are driven by control commands designated N0 through N5. These control commands correspond to the number of additional reversals desired during the control angle 2 $\alpha$. Thus, if zero reversals are desired, the switch N0 will be closed if one reversal is required, the switch N1, and so on. The manner in which these signals are obtained will be described in detail below.

The embodiment of FIG. 31 permits a maximum of six additional reversals, i.e., six reversals are possible with all switches open. As an example, the case where five additional reversals are required will be considered. The switch Z5 will be closed in response to the command N5. In such a case, the resistor W6 is shorted to ground and the voltage $U_3$ will similarly be at ground. The remainder of the resistors W0 through W5 divide the voltage $U_{St}$ into three equal portions. Thus, the voltage $U_2$ will be one-third of the voltage $U_{St}$ and the voltage $U_1$ two-thirds of the voltage $U_{St}$. Thus, starting with the control voltage $U_{St}$, the partial voltage $U_1$, $U_2$ and $U_3$ always have the same difference between each other; in the present case, one-third $U_{St}$. If a different number of additional reversals is required, another of the switches Z0 to Z5 is closed by means of the control commands N0 to N5.

The voltages $U_{St}$ and the voltages $U_1$ through $U_3$ are provided to the comparator means CI and CII as shown on FIG. 11. Each of the comparator means contain a comparator for each of the control voltages, i.e., there is a comparator for the voltage $U_{St}$, one for the voltage $U_1$, one for the voltage $U_2$ and one for the voltage $U_3$. Thus, in the present embodiment, there are four comparators and each comparator means CI and CII.

Figure 20:
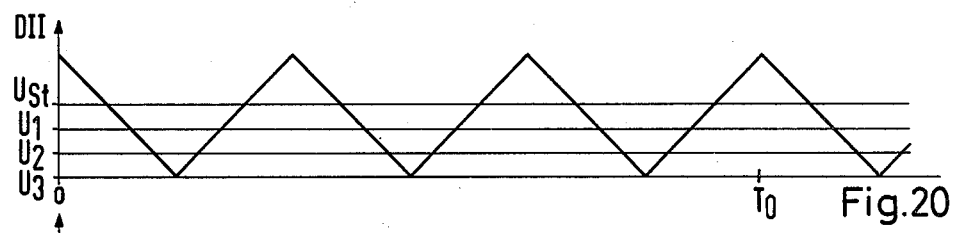
Figure 21:
Figure 22:
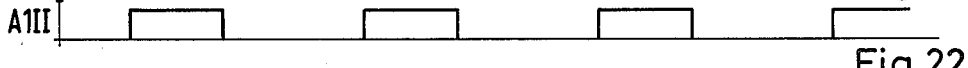
Figure 23:
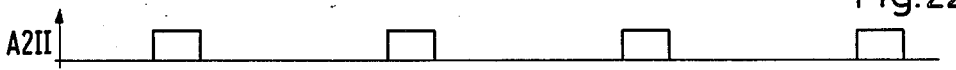
Figure 24:
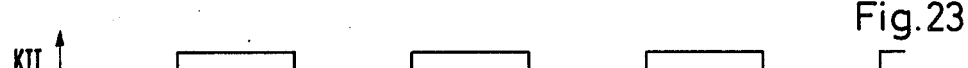

FIGS. 14 and 20 illustrate the waveshape of all the voltages which are provided into the comparator means CI and CII respectively. Thus, on FIG. 14 there is shown the triangular voltage D1 and the voltages $U_{St}$, $U_1$, $U_2$ and $U_3$, and on FIG. 20, the same control voltages along with the triangular voltage D2.

In well known fashion, the comparators in the comparator means will change state when the two compared voltages are equal. The figures illustrate the example assumed above where n = 5. Thus, referring to FIG. 14 as an example, as the triangular voltage D1 increases and becomes equal to the voltage $U_2$, a comparator output state will change. This is illustrated by the waveform A21 of FIG. 17. As the triangular voltage further increases to the point where it equals the voltage U1, another comparator will switch over as illustrated by the voltage A1I of FIG. 16. Finally, as the voltage $U_{St}$ is equaled, its associated comparator will switch over to form the waveform A0I shown on FIG. 15. In similar fashion, the waveforms A0II, A1II and A2II are formed in the comparator means CII. Since in each case the voltage waveform A3I or A3II which would be generated by the comparator associated with voltage $U_3$ will always remain at zero, it has not been shown on the figures.

As shown on FIG. 11, these outputs of the comparator means CI and CII are provided to respective modulation means MI and MII respectively. The modulation means provide, at their output, the voltage waveforms designated LI and LII shown respectively onn FIGS. 19 and 25. These outputs determine the shape of the AC output voltage such as the voltages $U_{11}$ and $U_{12}$ on FIG. 2 within the ange of the control angle 2 $\alpha$. Where an even number $n$ of desired reversls is selected, the output signals A0I through A3II are sufficient as information carriers. However, where $n$ is an odd number, this information is not sufficient since one additional switching operation at the zero points of the modified triangular voltages DI and DII is necessary. The additional information is obtained from a correction means designated K which forms correction signals KI and KII from the square voltage V of the oscillator O whenever a signal designated X indicates that the number n is odd. The correctionn signal KI is identical to the waveshape of the square wave voltage V. The correction signals KI, KII are shown on FIGS. 18 and 24. It will be recognized that the correction means K need only comprise an inverter with the voltage waveform V being provided directly therefrom as the voltage KI and its inverse through the inverters as the voltage KII.

An example of an embodiment of the modulation means MI and MII is shown on FIG. 32. It will be recognized that, although only modulation means MI is shown, both are of identical construction. As illustrated, the modulation stage includes nine NAND gates Y0 through Y8 coupled together. In general terms, gates Y0 - Y3 result in a modulation signal which causes a switch over of its associated voltage each time the triangular wave reaches a point where it equals the one of the voltages $U_{St}$, $U_1$, $U_2$ or $U_3$ shown on FIG. 14. As noted above in the example under consideration, A31 is zero. NAND gate Y3 acts as an inverter so that its output will remain at a logical "1." Considering the waveforms of FIGS. 14 through 19, it is seen that at the beginning of the presentation shown there, all of the remaining inputs A0I, A1I and A2I are high or logic "1"'s. Thus, gate Y2 has two "1" inputs and will have a "0" output. Gate Y1 will have a "0" input and one "1" input and will thus have a "1" output. Gate Y0 with two "1" inputs will have a "0" output. As shown, the signal KI is also high during this period. Thus, Y5 which acts as an inverter will have a "0" output. Gate Y4 which has a "0" input from gate Y0 will have a "1" output. As a result, gate Y7 will also have a "1" output. Gate Y6 which has one "0" and one "1" input will also have a "1" output and thus gate Y8 with two "1" outputs will have a "0" output as indicated by FIG. 19. When the voltage A21 goes from a "1" level to a "0" level as a triangular waveform DI equals the voltage $U_2$, gate Y2 will now have a "1" input and a "0" input and its output will go from "0" to "1." Gate Y1 now has two "1" inputs and its output goes to "0." Gate Y0 will now have a "1" input and a "0" input so that its output changes to a "1." The output of gate Y4 will thus be a "0" as will the output of gate Y5 as indicated above.

These two "0" inputs to gate Y7 will result in a "1" output. Gate Y6 will have a "1" input from the voltage K1 and a "1" input from the gate Y0 and thus its output will be a "0." The change in the output of Y6 results in gate Y8 no longer having two "1" inputs and its output then goes to a "1" as shown on FIG. 19. When the voltage U1 is exceeded, the input AlI goes low. In the manner described above, this changes the output of the gate Y0 which, through the gate Y4 and Y7 changes an output at the gate Y8. Note that an additional change occurs when signal K1 changes. Thus, it can be seen that the gates Y0 through Y3 causes a change every time one of the levels is exceeded and that the signal K1, through gates Y4 - Y8, causes an additional change at the peaks of the triangular waveform where an odd number of changes is required. The corresponding modulation signal for the modulation means M2 is shown as the output 12 on FIG. 25.

As illustrated by FIG. 11, the square wave voltage V is also provided as inputs to two ring counters BI and BII each having three output lines. Squarewave signals ZI1, ZI2, ZI3 and ZII1, ZII2 and ZII3 of duration T/3 are provided from the output lines of the ring counters. The signals are provided in sequence with the sequence repeated for each period T. The signals ZI1, ZI2 and ZI3 are shifted relative to each other by T/3 and relative to the corresponding signals ZII1, ZII2 and ZII3 by the time T/2. The signals from the ring counter BI change at the maximum of the modified triangular voltage DI and the signals of the ring counter BII at the maximum of the modified triangular voltage DII. These outputs are shown schematically in FIGS. 26 and 27.

Figure 28:
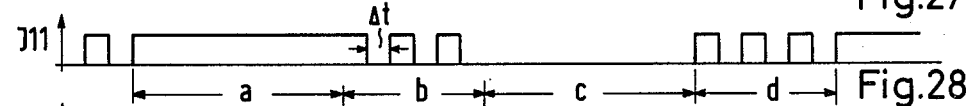
Figure 29:
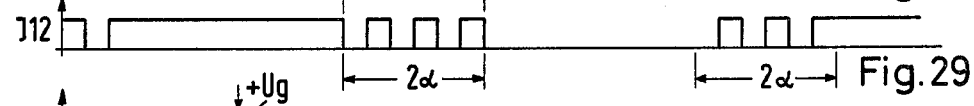
Figure 30:
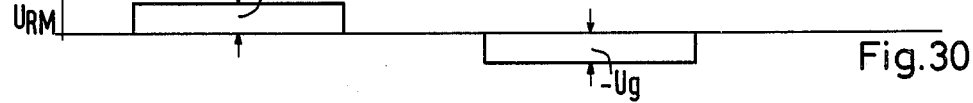

Three identically constructed phase signal transmitters H1, H2 and H3 which are associated with the individual inverters W1, W2 and W3 respectively of FIG. 1 have as their inputs the signals ZI1 to ZII3 of the ring counters BI and BII respectively. At the same time, the modulation signals LI, LII and the output signals AOI and AOII of the comparator means CI and CII are also provided as inputs to the phase signal transmitters. These signals are combined in a phase signal transmitter to furnish two phase signals per inverter, i.e., the signals J11, J12; J21, J22 and J31, J32. These control respectively, the switching timing of the sub-inverters W11, W12; W21, W22 and W31. The phase signals J11 to J32 of which the phase signals J11, J12 are shown in FIGS. 28 and 29 as a function of the time t, are then provided to the signal converters E11 through E32 which use these inputs to supply output variables required for the inverter rectifiers. If the inverters W1, W2 and W3 contain thyristors as controlled rectifiers, the signal converters E11 to E32 form the necessary firing pulses therefor in conventional fashion. The outputs of the signal converters E11 to E32 are designated on FIG. 11 as r1, r2; s1, s2 and t1, t2, representing similarly labelled values shown as outputs from the control unit ST in FIG. 1. FIG. 30 illustrates the resultant voltage $U_{RM}$ whose amplitude is equal to the supply voltage $U_g$.

An embodiment of phase signal transmitter H1 is shown on FIG. 33. It will be recognized that the phase signal transmitters H2 and H3 are similarly constructed. The phase signal transmitter H1 is made up of a number of NAND gates Y9 to Y25 which are logically tied together. The manner in which this logic arrangement provides the outputs J11 and J12 shown on FIGS. 28 and 29 will be evident to those skilled in the art from an examination of the figure.

In essence, the phase signal transmitter H1 results in the distribution of the input signals within four-fixed time areas $a, b, c, d$, to the two outputs, i.e., to the phase signals J11 and J22. The time areas a, b, c, d are shown on FIGS. 28 and 29. The time areas b and d correspond to the range of the control angle $2\alpha$. In these areas, the phase signals J11 and J12 are modulated, i.e., reversed several times. This is accomplished by using the modulation signal LII in the time area $b$ and the modulation signal LI in the time area $d$. The signal LI is coupled directly to the output J11 and the signal LII to the output J12 in an inverted manner as is evident from the drawings. The logic arrangement is constructed so that in the areas $a, c$ the phase signals J11, J12 are not modulated. This is done through a logical combination of signals AOI, ZI1, ZI3, ZII2, AOII and ZII1.

As noted above, the switches Z0 to Z5 of the group of switches Q of FIG. 31 are set in response to control signals N0 through N5 to select the number $n$ of the reversals. As can be seen from FIG. 11, the control signals N0 through N5 are formed in a forward-backward counter VR. Only one of the control commands N0 to N5 is present at one time. The forward-backward counter VR has two inputs to which counting signals SV and SR can be provided. A change of the setting signal SV from "1" to "0" at the one input causes an advance of the forward-backward counter VR. Thus, if N2 was present before such a change, the count would advance to provide the N3 output. A change of the setting signal SR from "1" to "0" at the other input results in a change in the backward direction so that if, for example, the count was providing the N5 signal and such a change occured, it would be counted down to the next number N4. Whether the count and thus the number $n$ of additional reversals in the range of the control angle $2\alpha$ is even or odd, is indicated by a signal X which may also be taken from the forward-backward counter VR. To obtain this signal, it is only necessary to provide the control commands N1, N3 and N5, i.e., the odd count outputs in an inverted form to a NAND gate having three inputs with the signal X taken from the output thereof. In essence, what is being done here is an ORing of the odd outputs so that if any odd output is present, the signal X will be provided.

The setting signals SV and SR are developed from a setting signal means SB. Means SB insures that the time spacing $\Delta t$ between two reversals does not drop below the lower limit as the control angle $2\alpha$ is reduced and does not exceed an upper limit when the control angle $2\alpha$ is increased or the operating frequency is decreased. The setting signal SV is generated if the time spacing of the switching edges, $\Delta t$ between any two switch overs in the range of the control angle $2\alpha$ [see FIG. 28] exceeds an upper limit equal to twice the lower limit $2\Delta t_{min}$ of the inverter. The signal SR is generated if the spacing $\Delta t$ between two switching operations falls below a minimum value equal to the lower limit $\Delta t_{min}$ of the inverter.

To determine the spacing $\Delta t$, one of the output signals AOI or AOII from the comprator means CI or CII and in addition, the corresponding modulation signal LI or LII are fed to the means SB. In the present embodiment, the signals used are AOII and LII.

Figure 25:
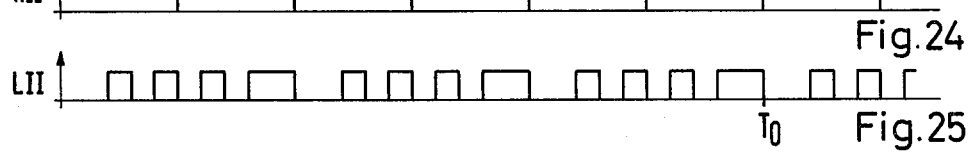
Figure 26:
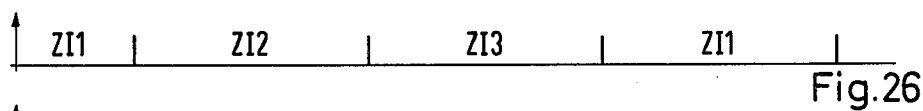
Figure 27:

An example of the means SB is shown on FIG. 34. Two mono-stable multi-vibrators MK1 and MK2 each with a delay time $\Delta t_{min}$ and two mono-stables MK3 and MK4 each with a delay time $2\Delta t_{min}$ are provided. Also included are NAND gates Y26 through Y31. Monostables MK2 and MK3 are driven driectly by the modultion signal LII and the monostables MK1 and MK4 by the signal LII inverted through NAND gates Y26 and Y27. Monostables MK1 and MK4 thus have outputs occuring on the rising edge and the monostables MK2 and MK3 output signals occuring for the falling edge of the modulation signal LII. The output signals of the monostables MK1 and MK2 are inputs to NAND gate Y28 which has as a further enabling input the signal AOII. The output of NAND gate Y28 is inverted through a further NAND gate Y29 to provide the signal output SR. In operation, monostable MK1 fires on the rising edge of the signal LII and the monostable MK2 fires on the falling edge. The pulse width of an LII pulse shown in FIG. 25 represents the width of a section such as one of the sections shown on FIG. 8. If this width falls below the minimum value $\Delta t_{min}$, the "1" signal from the output of monostable MK1 will still be present when the output of monostable MK2 goes to "1". If this occurs, during the control range $2\alpha$ as indicated by the enabling signal from AOII, gate Y28 will have an output going from "1" to "0" causing the forward-backward counter to be counted backward one count. Similarly, the monostables MK3 and MK4, the inverted outputs of which are provided to the NAND gate Y30, are used to generate a signal SV which increases the count in the forward-backward counter by one. In this case, on the leading edge of the pulse from the signal LII, the monostable MK3 is fired and its output coupled to the gate Y30 goes from a logical "1" to a logical "0" state. At the end of the time $2\Delta t_{min}$ it goes back to the logical "1" state. If the width of the LII pulse is less than $2\Delta t$, the monostable MK4 will have been fired by this time and its output coupled to the gate Y30 will be a "0" state resulting in the output of gate Y30 remaining unchanged. However, if the pulse width is longer than $2\Delta t_{min}$, the monostable MK4 will not yet have fired and its output will be at a "1." Thus, during the period when the gate Y30 is enabled by the signal AOII, should this occur, the output of Y30 will become a logical "1" resulting in a logical "0" signal at the output of gate Y31. This signal designated SV will then cause the counter to advance one count to cause the control range $2\alpha$ to be subdivided by one more unit.

Thus, an improved method of operating an inverter made up of sub-inverters coupled together through a choke having a center tap which permits keeping the choke to a minimum size has been shown. Although a specific embodiment has been illustrated and described, it will be obvious to those skilled in the art that various modifications may be made without departing from the spirit of the invention, which is intended to be limited solely by the appended claims.

What is claimed is:

1. A method of operating an inverter comprising two sub-inverters whose inputs are connected to a DC voltage source and whose outputs are connected together through a choke having a center tap where the AC output voltages of the sub-inverters shifted relative to each other by an adjustable control angle are combined through the choke to form a resultant voltage which is available at the center tap, comprising the steps of:
   a. reversing the two AC output voltages within a reversal portion defined as the range of the control angle during which the two voltages have opposite polarity; and
   b. carrying out said reversal at least once at each reversal portion in such a manner that both voltage are reversed simultaneously and in opposite directions.

2. The method accordint to claim 1 and further including the step of controlling the number of reversals such that the time spacing between two reversals does not fall below a lower limit determined essentially by the recovery time of the controlled rectifiers of the sub-inverters.

3. The method according to claim 1 and further including the step of subdividing reversal portion of the control angle into n+1 sections of equal size by n reversals of the two sub-inverters.

4. The method accordint to claim 3 and further including the step of controlling the number of reversals so that the time spacing between two reversals does not fall below a lower limit $\Delta t_{min}$ determined essentially by the recovery time of the controlled rectifiers of the sub-inverters.

5. The method according to claim 3 and further including the step of changing the number of sections as a function of the change in control angle.

6. The method according to claim 5 wherein said step of changing the number of sections is always carried to result in an increase or decrease of one.

7. The method according to claim 5 wherein the step of changing the number of sections in the increasing direction is carried out when the time spacing $\Delta\tau$ between two reversals becomes equal to a predetermined upper limit $\Delta\tau_{max}$.

8. The method accordint to claim 7 wherein said upper limit $\Delta\tau_{max}$ is equal to twich the lower limit $\Delta\tau_{max}$.

9. In an inverter consisting of two sub-inverters whose inputs are connected to a DC voltage and whose outputs are connected with each other through a choke having a center tap such that the AC output voltages of the sub-inverters shifted relative to each other by an adjustable control angle are combined using the choke to form a resultant voltage at the center tap, apparatus for reversing, within the range of the control angle, the two AC output voltages at least once and simultaneously in opposite directions comprising:
   a. a frequency generator furnishing first and second modified triangular voltages having the same frequency and amplitude but phase shifted relative to each other by one-half their period;
   b. first and second comparator means each made up of a plurality of comparators having as first inputs said two modified triangular voltages respectively;
   c. means for providing as further inputs to both said first and second comparator means a plurality of voltages, the difference in voltages between each two voltages being equal, said means comprising a voltage divider provided with a common control voltage used for determining the control angle;
   d. first and second modulation means having the outputs of said respective first and second comparator means as inputs and providing outputs to control the sub-inverters in the range of the control angle such that a reversal takes place each time a comparator in one of said comparator means switches over.

10. Apparatus according to claim 9 wherein said frequency generating means comprises:
   a. an oscillator having a triangular voltage output; and
   b. summing means having as inputs the outputs of said oscillator and a fixed DC voltage, said summing means adding said fixed DC voltage to the triangular voltage output of said oscillator to form said first and second triangular voltage waveforms.

11. Apparatus according to claim 10 wherein three identical inverters each comprising two sub-inverters are used to provide a three-phase output and further including:
  a. first and second ring counters having an outout of said frequency generating means as inputs;
  b. first, second and third phase signal means having the outputs of said ring counter and the outputs of said modulation means as inputs said phase signal means providing phase signal outputs for switching the three pairs of sub-inverters.

12. Apparatus according to claim 10 and further including means coupled to said voltage divider for adjusting the ratio of said voltage divider.

13. Apparatus according to claim 12 wherein said means comprise a plurality of switches each responsive to a separate control signal input and a forward-backward counter providing as outputs the control signal inputs to said group of switches.

14. Apparatus according to claim 13 and further including means for providing forward and backward inputs to said counter, said means comprising first and second monostable multi-vibrators having a delay time equal to a minimum time $\Delta t_{min}$ which time between two reversals cannot drop below and logic means to combine the outputs of said two monostables to provide a backward count input to said counter, if the time between two reversals drops below said time $\Delta t_{min}$.

15. Apparatus according to claim 14 and further including means to provide a forward count input to said forward-backward counter, said means comprising:
  a. third and fourth monostable multi-vibrators having a delay time equal to twice the minimum time $\Delta t_{min}$ said delay time being the maximum time desired between two reversals; and
  b. means combining the outputs of said third and fourth monostables to provide a forward count input to increase the count of said forward-backward counter if the time between the reversal exceeds the time twice $\Delta t_{min}$.

16. Apparatus according to claim 15 wherein said voltage divider comprises a series circuit of equal resistances coupled between said control voltage and ground, with taps for partial voltages being taken off after every second resistor starting with resistor coupled to said control voltage.

17. Apparatus according to claim 16 wherein at the tap between each two resistors in said voltage divider one of said plurality of switches is coupled with the other side of all switches coupled to ground.

* * * * *